(12) United States Patent
Follis

(10) Patent No.: US 9,531,545 B2
(45) Date of Patent: Dec. 27, 2016

(54) TRACKING AND NOTIFICATION OF FULFILLMENT EVENTS

(71) Applicant: Adobe Systems Incorporated, San Jose, CA (US)

(72) Inventor: Benjamin D. Follis, Redwood City, CA (US)

(73) Assignee: Adobe Systems Incorporated, San Jose, CA (US)

( * ) Notice: Subject to any disclaimer, the term of this patent is extended or adjusted under 35 U.S.C. 154(b) by 28 days.

(21) Appl. No.: 14/551,560

(22) Filed: Nov. 24, 2014

(65) Prior Publication Data

US 2016/0149707 A1    May 26, 2016

(51) Int. Cl.
    *H04L 9/32*       (2006.01)
    *H04L 29/06*      (2006.01)

(52) U.S. Cl.
    CPC ........... *H04L 9/3247* (2013.01); *H04L 63/126* (2013.01); *H04L 63/083* (2013.01)

(58) Field of Classification Search
    CPC ........................... H04L 9/3247; H04L 63/0457
    See application file for complete search history.

(56) References Cited

U.S. PATENT DOCUMENTS

| | | | |
|---|---|---|---|
| 5,825,880 A | 10/1998 | Sudia et al. | |
| 5,910,987 A | 6/1999 | Ginter et al. | |
| 6,073,101 A | 6/2000 | Maes | |
| 6,091,835 A | 7/2000 | Smithies et al. | |
| 6,157,935 A | 12/2000 | Tran et al. | |
| 6,240,091 B1 | 5/2001 | Ginzboorg et al. | |
| 6,615,234 B1 | 9/2003 | Adamske et al. | |
| 6,691,089 B1 | 2/2004 | Su et al. | |
| 6,928,421 B2 | 8/2005 | Craig et al. | |
| 6,959,382 B1 | 10/2005 | Kinnis et al. | |
| 7,581,109 B2 | 8/2009 | De Boursetty et al. | |

(Continued)

OTHER PUBLICATIONS

Craig Le Clair, "What to Look for in E-Signature Providers" (Nov. 15, 2011). Available at https://www.echosign.adobe.com/content/dam/echosign/docs/pdfs/Forrester_What_To_Look_For_In_E-Signature_Providers_Nov_2011.pdf.

(Continued)

*Primary Examiner* — Kambiz Zand
*Assistant Examiner* — Noura Zoubair
(74) *Attorney, Agent, or Firm* — Finch & Maloney PLLC

(57) ABSTRACT

An electronic signature system is used to procure one or more electronic signatures on a document. The electronic signature system not only facilitates communication between the document originator and the document recipient, but it also tracks the document status through states such as sent, viewed, executed, and fulfilled. For example, at some point the electronic signature system may receive an incoming notification that an obligation set forth in the signed document has been fulfilled. This incoming fulfillment notification is recorded and the document status is updated accordingly. The electronic signature system can also be configured to generate outgoing fulfillment notifications to announce that an obligation associated with the signed document has been fulfilled. The various notifications and fulfillment events disclosed herein can be tracked so as to allow users to generate status reports that reveal the fulfillment status of a collection of documents administered by the electronic signature.

19 Claims, 7 Drawing Sheets

(56) References Cited

U.S. PATENT DOCUMENTS

| | | | |
|---|---|---|---|
| 7,694,143 B2 | 4/2010 | Karimisetty et al. |
| 7,779,355 B1 | 8/2010 | Erol et al. |
| 7,895,166 B2 | 2/2011 | Foygel et al. |
| 7,996,367 B2 | 8/2011 | Foygel et al. |
| 7,996,439 B2 | 8/2011 | Foygel et al. |
| 8,126,868 B1 | 2/2012 | Vincent |
| 8,234,494 B1 | 7/2012 | Bansal et al. |
| 8,844,055 B2 | 9/2014 | Follis et al. |
| 8,918,311 B1 | 12/2014 | Johnson et al. |
| 8,930,308 B1 | 1/2015 | Johnson et al. |
| 9,058,515 B1 | 6/2015 | Amtrup et al. |
| 2002/0038290 A1 | 3/2002 | Cochran et al. |
| 2002/0095290 A1 | 7/2002 | Kahn et al. |
| 2002/0103656 A1 | 8/2002 | Bahler et al. |
| 2003/0009513 A1 | 1/2003 | Ludwig et al. |
| 2003/0037004 A1 | 2/2003 | Buffum et al. |
| 2003/0074216 A1 | 4/2003 | Salle |
| 2003/0083906 A1 | 5/2003 | Howell et al. |
| 2003/0154083 A1 | 8/2003 | Kobylevsky et al. |
| 2003/0187671 A1 | 10/2003 | Kumhyr et al. |
| 2003/0217275 A1 | 11/2003 | Bentley et al. |
| 2004/0102959 A1 | 5/2004 | Estrin |
| 2004/0139344 A1 | 7/2004 | Maurer |
| 2004/0167847 A1 | 8/2004 | Nathan |
| 2004/0204939 A1 | 10/2004 | Liu et al. |
| 2004/0225887 A1 | 11/2004 | O'Neil et al. |
| 2004/0243811 A1 | 12/2004 | Frisch et al. |
| 2004/0264652 A1 | 12/2004 | Erhart et al. |
| 2005/0228999 A1 | 10/2005 | Jerdonek et al. |
| 2005/0289345 A1 | 12/2005 | Haas et al. |
| 2006/0020460 A1 | 1/2006 | Itou |
| 2006/0041828 A1 | 2/2006 | King et al. |
| 2006/0110011 A1 | 5/2006 | Cohen et al. |
| 2006/0143462 A1 | 6/2006 | Jacobs |
| 2006/0157559 A1 | 7/2006 | Levy et al. |
| 2006/0212813 A1 | 9/2006 | Yalovsky et al. |
| 2006/0253324 A1 | 11/2006 | Miller |
| 2007/0055517 A1 | 3/2007 | Spector |
| 2007/0113164 A1 | 5/2007 | Hansen et al. |
| 2007/0124507 A1 | 5/2007 | Gurram et al. |
| 2007/0143398 A1 | 6/2007 | Graham |
| 2007/0220614 A1 | 9/2007 | Ellis et al. |
| 2007/0226511 A1 | 9/2007 | Wei et al. |
| 2008/0015883 A1 | 1/2008 | Hermann |
| 2008/0177550 A1 | 7/2008 | Mumm et al. |
| 2008/0180213 A1 | 7/2008 | Flax |
| 2008/0195389 A1 | 8/2008 | Zhang et al. |
| 2009/0062944 A1 | 3/2009 | Wood et al. |
| 2009/0112767 A1* | 4/2009 | Hammad ............. G06Q 10/087 705/44 |
| 2009/0116703 A1 | 5/2009 | Schultz |
| 2009/0117879 A1 | 5/2009 | Pawar et al. |
| 2009/0177300 A1 | 7/2009 | Lee |
| 2009/0222269 A1 | 9/2009 | Mori |
| 2009/0228584 A1 | 9/2009 | Maes et al. |
| 2009/0254345 A1 | 10/2009 | Fleizach et al. |
| 2009/0260060 A1 | 10/2009 | Smith et al. |
| 2009/0307744 A1 | 12/2009 | Nanda et al. |
| 2009/0327735 A1 | 12/2009 | Feng et al. |
| 2010/0131533 A1 | 5/2010 | Ortiz |
| 2010/0161993 A1 | 6/2010 | Mayer |
| 2010/0281254 A1 | 11/2010 | Carro |
| 2010/0306670 A1 | 12/2010 | Quinn et al. |
| 2011/0022940 A1 | 1/2011 | King et al. |
| 2011/0047385 A1 | 2/2011 | Kleinberg |
| 2011/0212717 A1 | 9/2011 | Rhoads et al. |
| 2011/0225485 A1 | 9/2011 | Schnitt |
| 2012/0072837 A1* | 3/2012 | Triola ............. G06Q 50/18 715/268 |
| 2012/0254332 A1 | 10/2012 | Irvin |
| 2013/0046645 A1 | 2/2013 | Grigg et al. |
| 2013/0089300 A1 | 4/2013 | Soundararajan et al. |
| 2013/0103723 A1 | 4/2013 | Hori |
| 2013/0132091 A1 | 5/2013 | Skerpac |
| 2013/0166915 A1 | 6/2013 | Desai et al. |
| 2013/0179171 A1 | 7/2013 | Howes |
| 2013/0182002 A1 | 7/2013 | Macciola et al. |
| 2013/0191287 A1 | 7/2013 | Gainer et al. |
| 2013/0269013 A1 | 10/2013 | Parry et al. |
| 2013/0283189 A1 | 10/2013 | Basso et al. |
| 2013/0339358 A1 | 12/2013 | Huibers et al. |
| 2014/0019761 A1 | 1/2014 | Shapiro |
| 2014/0078544 A1 | 3/2014 | Motoyama et al. |
| 2014/0079297 A1 | 3/2014 | Tadayon et al. |
| 2014/0236978 A1 | 8/2014 | King et al. |
| 2014/0282243 A1 | 9/2014 | Eye et al. |
| 2014/0294302 A1 | 10/2014 | King et al. |
| 2014/0343943 A1 | 11/2014 | Al-Telmissani |
| 2014/0365281 A1 | 12/2014 | Onischuk |
| 2014/0372115 A1 | 12/2014 | LeBeau et al. |
| 2015/0012417 A1 | 1/2015 | Joao et al. |
| 2015/0016661 A1 | 1/2015 | Lord |
| 2015/0063714 A1 | 3/2015 | King et al. |
| 2015/0073823 A1* | 3/2015 | Ladd ............. G06Q 30/018 705/2 |
| 2015/0100578 A1 | 4/2015 | Rosen et al. |
| 2015/0172058 A1 | 6/2015 | Follis |
| 2016/0078869 A1 | 3/2016 | Syrdal et al. |

OTHER PUBLICATIONS

U.S. Appl. No. 14/069,674, filed Nov. 1, 2013.
U.S. Appl. No. 14/534,583, filed Nov. 6, 2014.
Simske, Steven J. Dynamic Biometrics: The Case for a Real-Time Solution to the Problem of Access Control, Privacy and Security. 2009 First IEEE International Conference on Biometrics, Identiy and Security. Pub. Date: 2009. http://eeexplore.ieee.org/stamp/stamp.jsp?tp=&amumber=5507535.
Maeder, Anthony; Fookes, Clinton; Sridharan, Sridha. Gaze Based User Authentication for Personal Computer Applications. Proceedings of 2004 International Symposium on Intelligent Multimedia, Video and Speech Processing. Pub. Date: 2004. http://ieeexplore.ieee.org/stamp/stamp.jsp?tp=&arnumber=1434167.
Notice of Allowance received in U.S. Appl. No. 14/625,852 (sent Jul. 25, 2016).
Notice of Allowance received in U.S. Appl. No. 14/107,967 (sent Nov. 3, 2016) (6 pages).

* cited by examiner

FIG. 2

| | Document Recipient (51) | Document Name (52) | Document Status (53) | Status Date (54) | Linked Documents (55) |
|---|---|---|---|---|---|
| Document Status Index (50) | John Doe | purchase agreement | fulfilled | 3 January 2014 | View |
| | Mike Sharperson | car insurance agreement | executed; in effect | 1 July 2014 | View |
| | Tim Crews | boat rental agreement | sent; waiting for signature | 31 August 2014 | View |

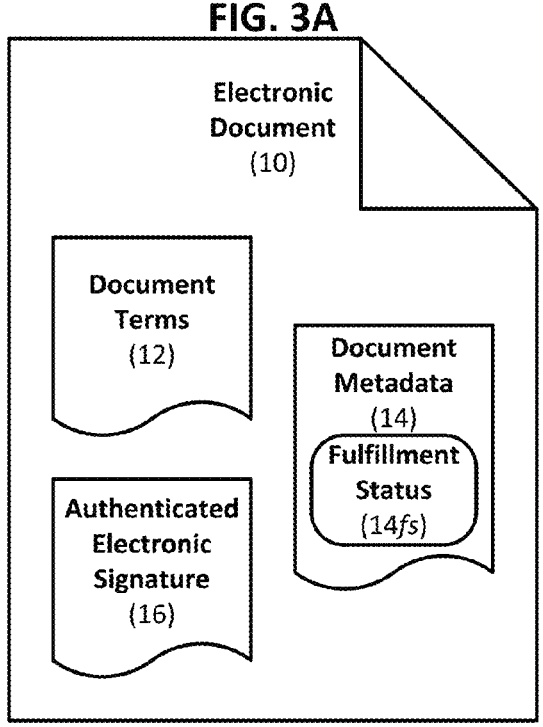
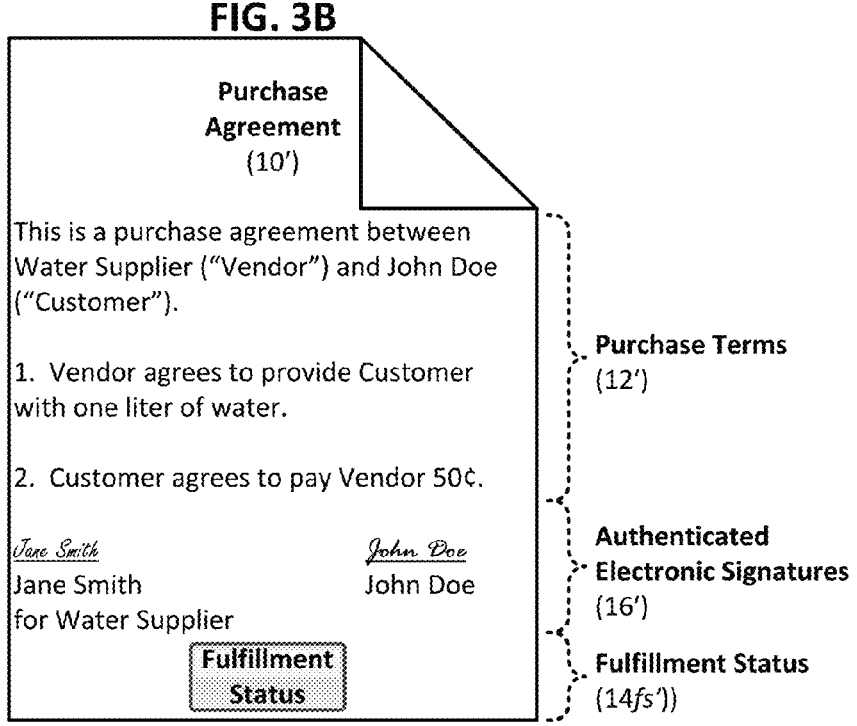

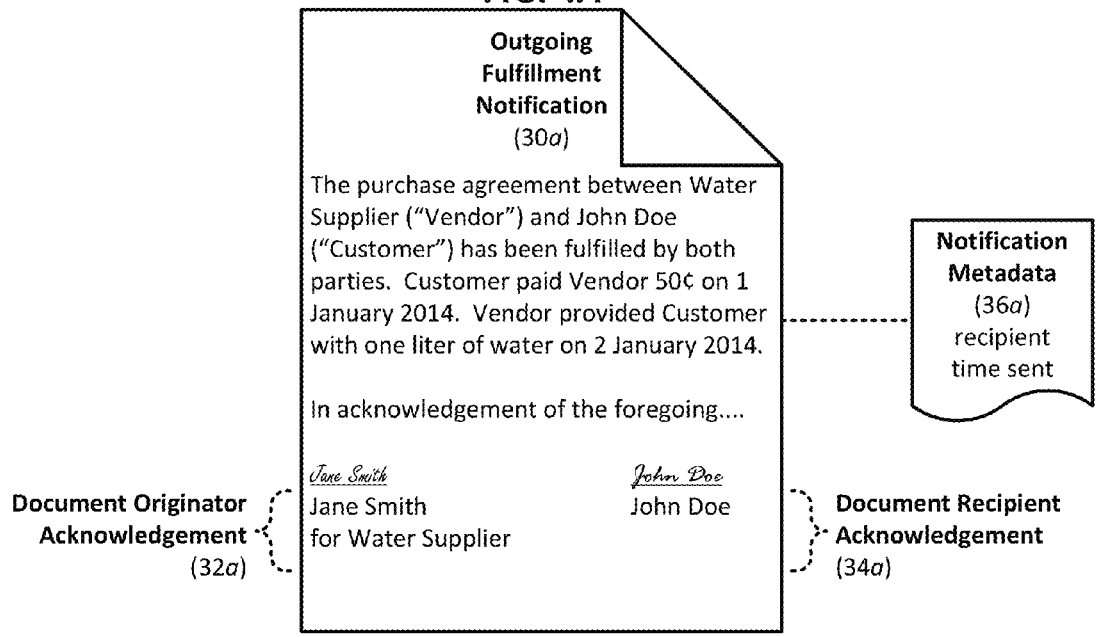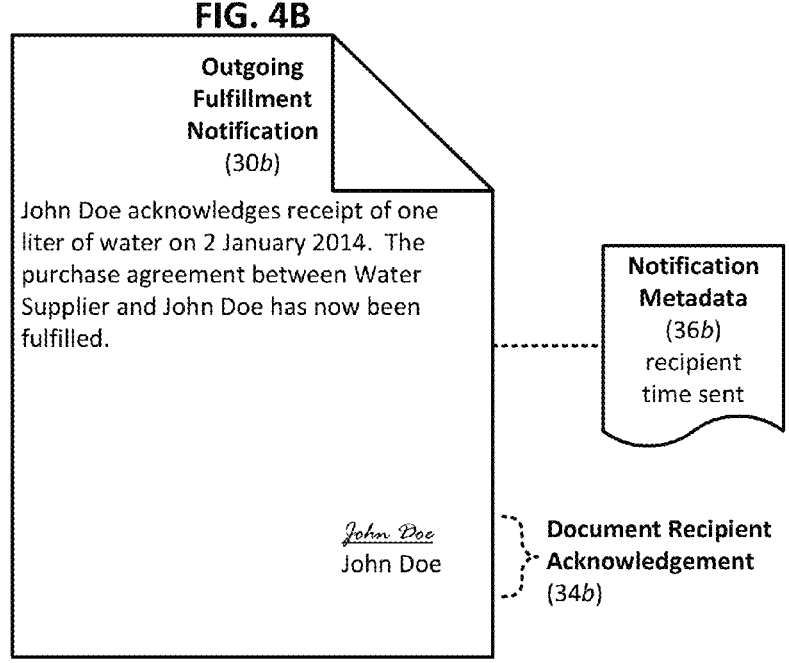

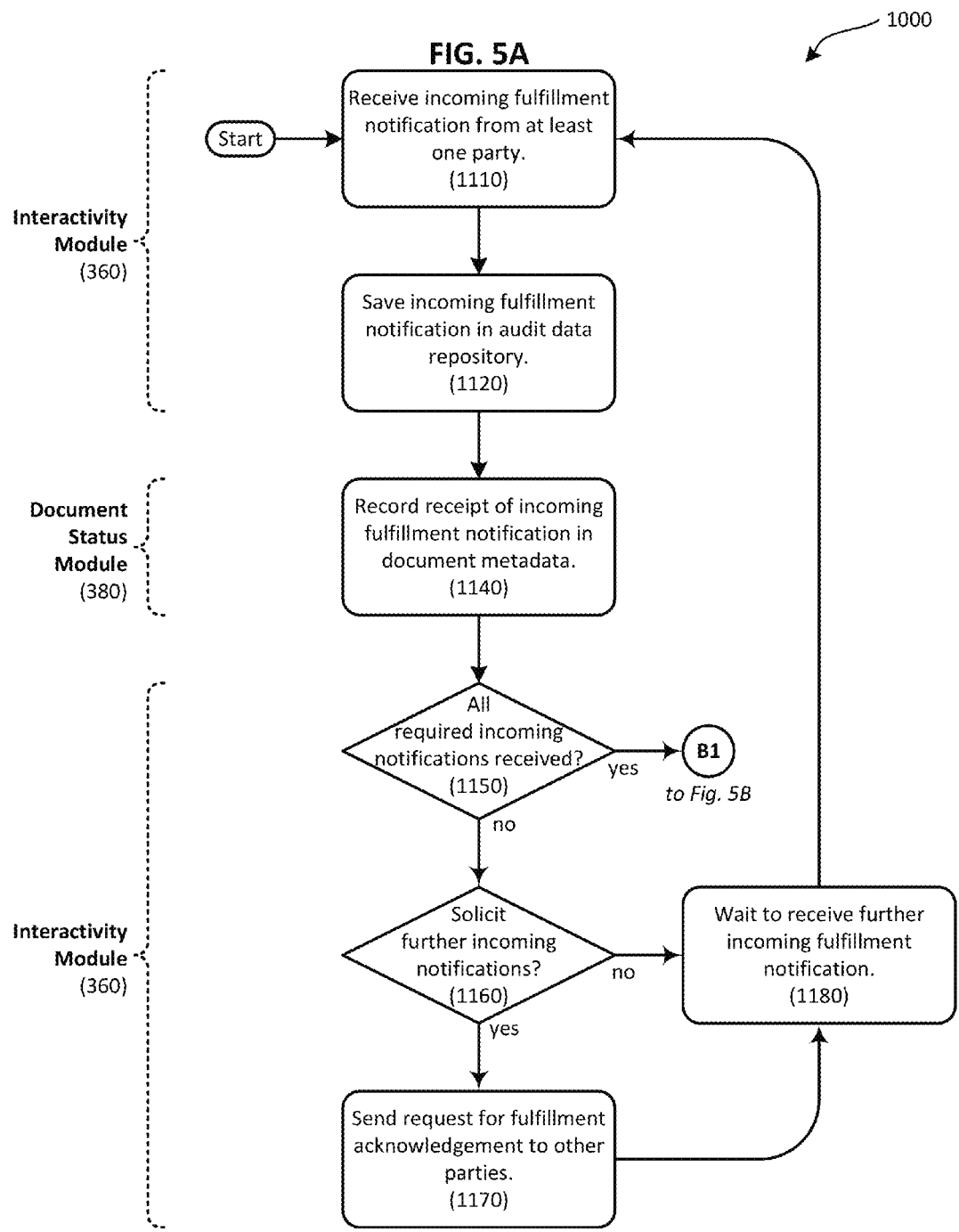

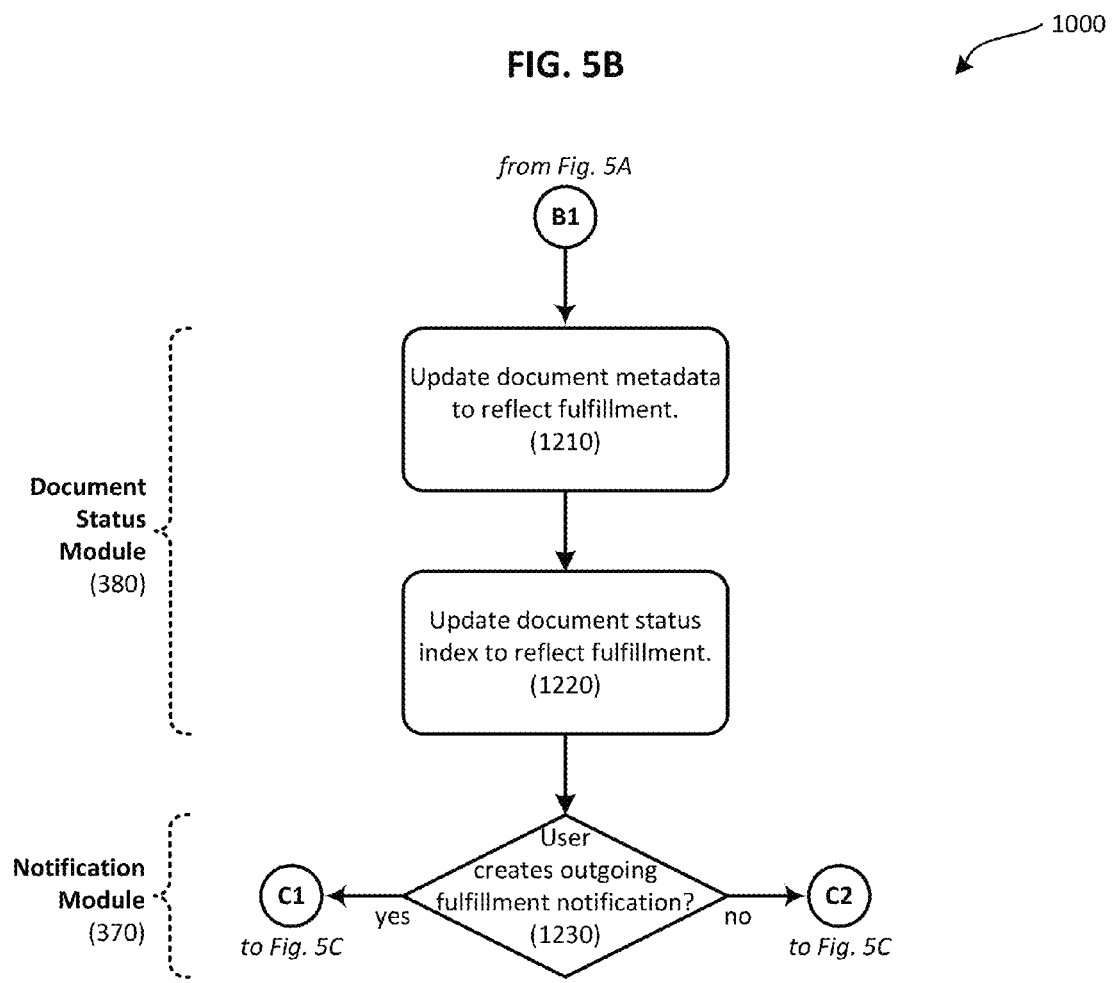

US 9,531,545 B2

TRACKING AND NOTIFICATION OF FULFILLMENT EVENTS

FIELD OF THE DISCLOSURE

This disclosure relates generally to document processing workflows, and more specifically to workflows that facilitate automated tracking and notification of fulfillment events associated with an electronic document.

BACKGROUND

Computers and electronic documents have become an increasingly indispensable part of modern life. In particular, as virtual storage containers for binary data, electronic documents have gained acceptance not only as a convenient replacement for conventional paper documents, but also as a useful way to store a wide variety of digital assets such as webpages, sound recordings, and videos. The increased use of electronic documents has resulted in the adaptation of conventional paper-based document processing workflows to the electronic realm. One such adaption has been the increased use and acceptance of electronic signatures on agreements, contracts, and other documents. When negotiating parties reach an agreement with respect to a course of action, state of affairs, or other subject matter, the resulting agreement is usually reduced to writing and executed by the parties as a way to memorialize the terms of the agreement. Traditionally, a physical copy of the agreement was executed with a personalized stamp, seal, or handwritten signature. However, since this "reduction to writing" now often takes the form of an electronic document stored on a computer readable medium, electronic signatures have become commonplace and have indeed gained widespread legal recognition. See, for example, the Electronic Signatures in Global and National (ESIGN) Commerce Act, 15 U.S.C. §96. Even where an agreement is never actually reduced to writing, the resulting "oral contract" may still be enforceable if evidentiary questions as to the substance of the underlying agreement can be resolved. The wide variety of different formats and legal requirements relating to agreements has resulted in an correspondingly wide variety of workflows—both conventional and electronic—that facilitate the negotiation, formation, execution, fulfillment, and management of agreements, contracts, and other documents.

BRIEF DESCRIPTION OF THE DRAWINGS

FIG. 2 is a schematic illustration of an example document status index that correlates managed documents with a fulfillment status.

FIG. 3A is a schematic illustration of selected components of an electronic document that can be processed in accordance with certain of the techniques disclosed herein.

FIG. 3B is a schematic illustration of an example purchase agreement that can be processed in accordance with certain of the techniques disclosed herein.

FIG. 4A is a schematic illustration of an example outgoing fulfillment notification indicating that two parties to an agreement have acknowledged fulfillment of the agreement.

FIG. 4B is a schematic illustration of an example outgoing fulfillment notification indicating that one party to an agreement has acknowledged fulfillment of the agreement.

FIGS. 5A through 5C comprise a flowchart illustrating an example method for automated tracking and notification of fulfillment events associated with an electronic document.

DETAILED DESCRIPTION

Figure 1:
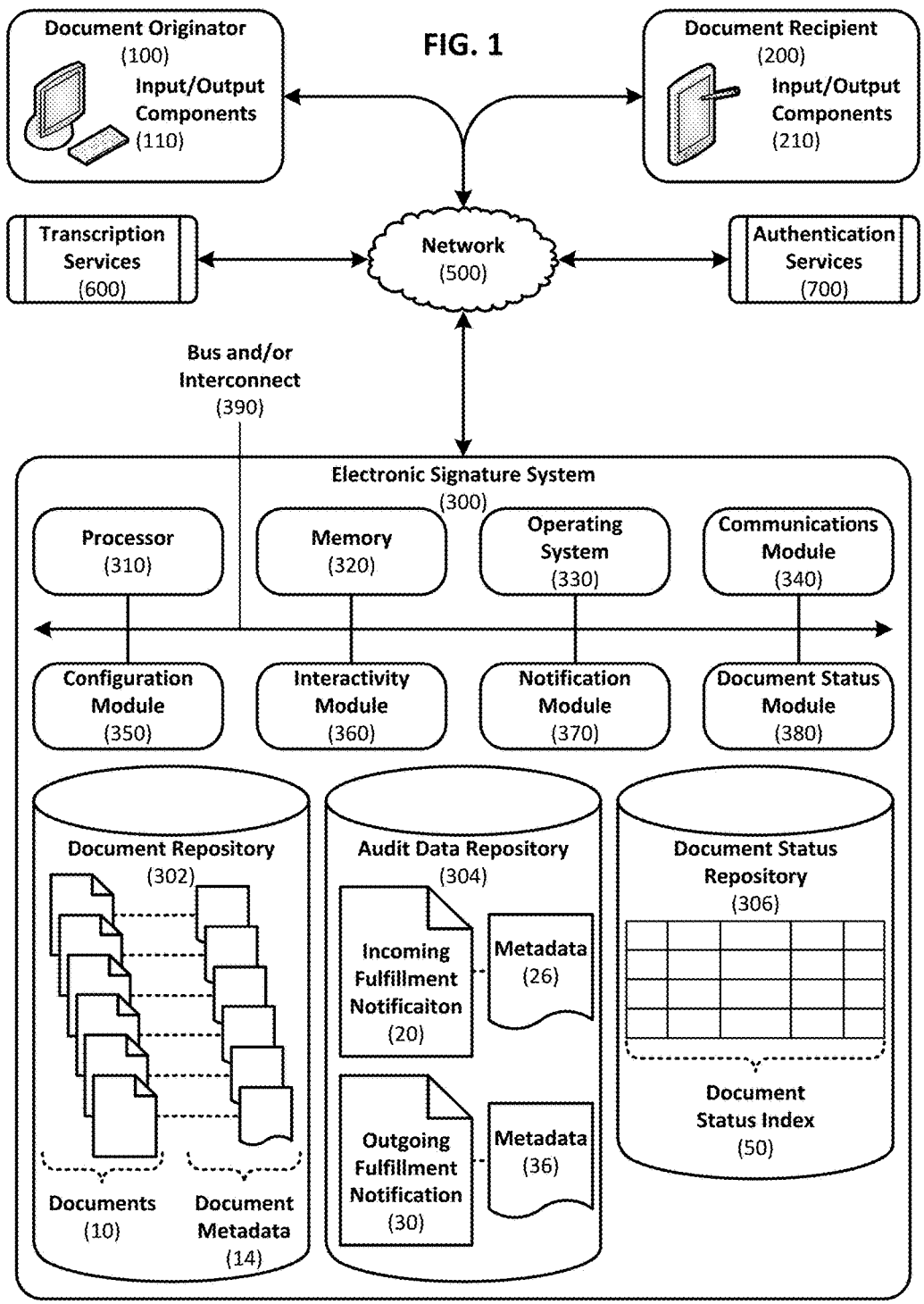
FIG. 1 is a block diagram illustrating selected components of an example system that facilitates automated tracking and notification of fulfillment events associated with an electronic document.

While many benefits have been derived from the adaptation of conventional paper-based document processing workflows to the electronic realm, the electronic document workflows that have been developed still suffer from certain shortcomings. Many of these shortcomings arise from the fact that document processing workflows often impose tracking and notification burdens on one or more parties involved in the workflow. For example, when a borrower makes a final payment that fulfills a loan obligation, the lender has an obligation to send and maintain a notification record that acknowledges that the borrower's obligation has been fulfilled. The borrower also has an obligation to retain such notification for tax and dispute resolution purposes. While general purpose document management systems exist, such systems are not well suited to tracking fulfillment events associated with documents such as contracts and other agreements. As a result, such systems have not been integrated with electronic signature services which are used to procure electronic signatures on such documents in the first place. As a consequence, separate systems are used for initially obtaining an electronic signature on a document and subsequently managing the workflows that invoke the signed document. The resulting inefficiencies and opportunities for inaccurate recordkeeping represent substantial impediments to users seeking to improve the efficiency and reliability of their document management workflows.

Thus, and in accordance with certain of the embodiments disclosed herein, techniques are provided for automated tracking and notification of fulfillment events associated with an electronic document. In one implementation an electronic signature system is used to procure one or more electronic signatures on a document. The electronic signature system not only facilitates communication between the document originator and the document recipient, but it also tracks the document status through states such as sent, viewed, executed, and fulfilled. For example, at some point the electronic signature system may receive an incoming notification that an obligation set forth in the signed document has been fulfilled. This incoming fulfillment notification is recorded and the document status is updated accordingly. Depending on how a particular document has been configured, it may be required that incoming fulfillment notifications be received from one or more specific parties before the document status is recorded as being fulfilled. In some cases incoming fulfillment notifications are actively solicited from certain parties, such as by sending a request that a second party acknowledge the accuracy of a first party's fulfillment notification. The electronic signature system can also be configured to generate outgoing fulfillment notifications to announce that an obligation associated with the signed document has been fulfilled. The various notifications and fulfillment events disclosed herein can be tracked so as to allow users to generate status reports that reveal the fulfillment status of a collection of documents administered by the electronic signature system. This approach advantageously enables an electronic signature system to not only manage procurement of electronic signatures on a document, but also to manage subsequent tracking of fulfillment events associated with the electronically signed document. Numerous configurations and variations of such embodiments will be apparent in light of this disclosure.

As used herein, the term "document" refers, in addition to its ordinary meaning, to any collection of information that can be communicated between users of the various systems disclosed herein. As used herein, the term "document terms" refers, in addition to its ordinary meaning, to content provided within, or accessible via, a document. A document can take the form of a physical object, such as one or more papers containing printed information, or in the case of an "electronic document", a computer readable medium containing digital data. Electronic documents can be rendered in a variety of different ways, such as via display on a screen, by printing using an output device, or aurally using an audio player and/or text-to-speech software. Thus it will be appreciated that electronic documents may include digital assets in addition to or instead of text; such digital assets may include, for example, audio clips, video clips, photographs, and other multimedia assets. Documents may encompass a virtually unlimited range of subject matter, including documents that contain terms that are to be agreed to among various participants in a given workflow. Examples of such documents include agreements, settlements, and legally binding contracts. For instance, both a word processing file containing the terms of a legally enforceable contract as well as a compressed audio file containing an audio recording of the same contract terms would be considered "documents" for the purposes of this disclosure. Such textual and audio components may be combined into a single document in certain embodiments. Documents may be communicated amongst users by a variety of techniques ranging from physically moving papers containing printed matter to wired and/or wireless transmission of digital data.

As used herein the term "document originator" (or "originator") refers, in addition to its ordinary meaning, to a user or entity that represents the source of a document in a workflow. Likewise, the term "document recipient" (or "recipient") refers, in addition to its ordinary meaning, to a user or entity that represents the target of a document in a workflow. Thus in a generalized workflow, a document originator can be understood as sending a document to a document recipient. It will be appreciated that a document originator may not necessarily be the creator, author, or generator of a particular document, but rather may simply be a user or entity that initiates a workflow by sending a document to a recipient. Likewise, the document recipient may not be the ultimate recipient of a document, particularly where a document is routed amongst multiple users in a given workflow. Thus, a single user or entity may act as both a document originator and a document recipient in different contexts. It will also be appreciated that the terms document originator and document recipient are not limited to people or users, but may also refer to entities, organizations, or workstations which originate or receive documents as part of a workflow. Finally, a given workflow may not necessarily involve the document itself being transmitted from document originator to document recipient; in some cases other data relating to a document, such as metadata and/or a network address, may additionally or alternatively be transmitted between a document originator and a document recipient.

As used herein, the term "electronic signature" refers, in addition to its ordinary meaning, to data that can be attached to or logically associated with an electronic document. Thus an electronic signature may comprise, for example, a string of characters, a bitmap image such as an image of a handwritten signature, an audio and/or video recording of a person saying a spoken phrase and/or making a designated gesture (such as saying "I agree to these terms" while making a thumbs-up gesture), or a digital key. Electronic signatures may or may not be encrypted or otherwise encoded in a way that limits access and/or modification by unauthorized parties. An electronic signature may be personalized and associated with a particular individual, or may be generated automatically in response to a specified user input, such as the selection of an electronic checkbox, the clicking of a button on a graphical user interface, or the generation of a touch-tone using a telephone keypad. It will be appreciated that an electronic signature need not necessarily be incorporated into a particular electronic document, but may simply be stored in a resource managed by, for example, an electronic signature system, which can then create a logical association between the electronic signature and a particular electronic document. Where an electronic signature is encoded using binary digits, it may also be referred to as a "digital signature". One example of a product which provides services associated with an electronic signature system is Adobe Echosign (Adobe Systems Incorporated, San Jose, Calif.).

In many applications, particularly in the context of legal documents, a document may define or otherwise establish one or more obligations that are associated with the document originator and/or the document recipient. Such an obligation can be understood as a duty to perform a particular action, to conduct oneself in a particular manner, or to otherwise bind oneself by a promise. For example, a purchase agreement may obligate a seller to deliver goods and obligate a purchaser to remit payment. One example of a purchase agreement is illustrated in FIG. 3A, wherein purchase terms 12' establish the obligations of the vendor and the customer. A mortgage agreement may obligate a borrower to grant a lien and make a series of installment payments, and may obligate a lender to make a single lump-sum payment and release the lien at a future date. An insurance policy may obligate an insurer to pay certain claims and obligate an insured to make periodic premium payments. In many other instances a document may establish an obligation with respect to a single party. For example, a declaration may obligate the declarant to refrain from making willfully false statements in the declaration. And a credit card receipt may obligate a purchaser to remit payment pursuant to previously executed credit card terms.

As used herein, the terms "incoming fulfillment notification" and "outgoing fulfillment notification" refer, in addition to their ordinary meanings, to data indicating than an obligation associated with a document has been fulfilled. In general, fulfillment can be understood as the completion, realization, or execution of an obligation. Where a document imposes obligations on multiple parties, it will be appreciated that a first party may fulfill his/her obligations before a second party, and therefore that the obligations associated with such a document may be only partially fulfilled at a given time. For example, in the context of the aforementioned purchase agreement, the seller's fulfillment occurs when the goods are delivered, while the purchaser's fulfillment occurs when payment is remitted. In the context of the aforementioned mortgage agreement, the borrower's fulfillment occurs when the last payment is remitted, while the lender's fulfillment occurs when the lien is released. In some cases fulfillment may occur as soon as the document is executed, such as in the case of a factual declaration that imposes an obligation on the declaration to refrain from making willfully false statements.

A fulfillment notification can therefore be understood as a notification that a particular obligation has been fulfilled. More specifically, incoming fulfillment notifications refer to communications received by an electronic signature system, whereas outgoing fulfillment notifications refer to communications transmitted from an electronic signature system. Thus, in certain embodiments where a notification is transmitted from one electronic signature system to another, such a notification could be considered both incoming and outgoing depending on the particular frame of reference. Incoming and outgoing fulfillment notifications may be automatically generated by one of the modules disclosed herein, or alternatively, may be defined, authored, or otherwise generated by a user. The data comprising such communications may be intended for human and/or computer consumption. For example, a given notification may include a textual component providing details regarding the fulfilled obligation, as well as a binary component comprising computer code that, when executed or otherwise processed by a software module, causes a particular workflow to be invoked or initiated. In some cases a fulfillment notification includes an electronic signature that indicates that a party has authorized, acknowledged, or otherwise acted in response to the notification.

For documents which are invoked in a workflow, an obligation can be understood as representing a state in the workflow, and fulfillment of an obligation can be understood as representing progression of the workflow from one state to another. Thus, referring again to the aforementioned example purchase agreement which defines a legal obligation to deliver goods and remit payment, these obligations represent workflow states wherein goods are being delivered and funds are being remitted, respectively. Fulfillment of such obligations can be detected automatically, for example in response to processing a packing list, receiving a delivery confirmation signature, or receiving an incoming payment. In such embodiments the triggering fulfillment event can be performed by a computing device in communication with electronic signature server. The electronic signature server can be configured to automatically process one or more fulfillment notifications in response to the fulfillment event. In alternative embodiments obligation fulfillment is processed in response to specific user input indicating that a particular obligation has been fulfilled. In either case, detection of the fulfillment event causes the workflow to progress to a subsequent state.

System Architecture

FIG. 1 is a block diagram illustrating selected components of an example system that facilitates automated tracking and notification of fulfillment events associated with an electronic document. More specifically, the system illustrated in FIG. 1 can be understood as enabling a document originator 100 and a document recipient 200 to interact with each other in a workflow that is managed by an electronic signature system 300. In such embodiments, document originator 100, document recipient 200, and electronic signature system 300 communicate with each other via a network 500. Network 500 can also be used to access supplementary services and resources, such as transcription services 600 and/or authentication services 700. Additional or alternative services and resources may be provided in other embodiments. In some cases one or more of such services and resources may be integrated into and provided by one or more of document originator 100, document recipient 200, and/or electronic signature system 300, as will be described in turn. Thus other embodiments may have fewer or more networked services and/or resources depending on the granularity of implementation. It will therefore be appreciated that the embodiments disclosed herein are not intended to be limited to the provision or exclusion of any particular services and/or resources.

As illustrated in FIG. 1, document originator 100 and document recipient 200 each have access to a device that facilitates interaction with other users and/or other components of the various systems that are illustrated in FIG. 1 and/or are otherwise described herein. For example, in certain embodiments document originator 100 and document recipient 200 each have access to one or more of a variety of suitable computing devices, including devices such as desktop computers, laptop computers, workstations, enterprise class server computers, handheld computers, tablet computers, cellular telephones, smartphones, and set-top boxes. Other devices may be used in other embodiments. The device used by document originator 100 and/or document receipt 200 optionally includes a wired and/or wireless communication adapter that enables communication via network 500. The device also optionally includes input/output components 110, 210 such as one or more of a tactile keyboard, a display, a touch sensitive display, a microphone, a camera, and location services.

For example, in one implementation document originator 100 represents a lender and document recipient 200 represents a borrower, each of whom have access to one or more of a variety of suitable computing devices. In such implementations document originator 100 initiates a workflow that involves sending a loan agreement to document recipient 200 for electronic signature. Document recipient 200 electronically signs the loan agreement as part of the workflow. Later, after the loan is fully paid, document originator 100 initiates a workflow that causes a fulfillment notification to be sent to document recipient 200, thus providing document recipient 200 with a confirmation that his/her obligations under the loan agreement have been fulfilled. Document originator 100 and document recipient 200 can both use a variety of different computing devices, each having a corresponding variety of different input/output components 110, 210, to invoke various aspects of such a workflow. While this example implementation involves the execution and fulfillment of a loan agreement, it will be appreciated that other implementations involve workflows associated with a wide range of other types of electronic documents.

Referring still to the example embodiment illustrated in FIG. 1, electronic signature system 300 can be configured to manage and orchestrate workflows that enable documents provided by document originator 100 to be distributed to document recipient 200; that enable document recipient 200 to electronically sign such documents; and that enable both parties to send and receive fulfillment notifications relating to obligations set forth in the signed document. To this end, electronic signature system 300 includes one or more software modules configured to implement certain of the functionalities disclosed herein, and optionally further includes hardware configured to enable such implementation. This hardware may include, but is not limited to, a processor 310, a memory 320, an operating system 330, and a communications module 340. Processor 310 can be any suitable processor, and may include one or more coprocessors or controllers, such as an audio processor or a graphics processing unit, to assist in processing operations of electronic signature system 300. Memory 320 can be implemented using any suitable type of digital storage, such as one or more of a disk drive, a universal serial bus drive, flash memory, and/or random access memory. Operating system 330 may comprise any suitable operating system, such as Google Android (Google Inc., Mountain View, Calif.), Microsoft Windows (Microsoft Corp., Redmond, Wash.), or Apple OS X (Apple Inc., Cupertino, Calif.). As will be appreciated in light of this disclosure, the techniques provided herein can be implemented without regard to the particular operating system provided in conjunction with electronic signature system 300, and therefore may also be implemented using any suitable existing or subsequently-developed platform. Communications adaptor 340 can be any appropriate network chip or chipset which allows for wired and/or wireless communication via network 500 to one or more of the other components described herein. A bus and/or interconnect 390 may also be provided to allow for inter- and intra-device communications using, for example, communications adaptor 340.

In certain embodiments electronic signature system 300 includes a configuration module 350 that enables a user to define aspects of a workflow such as how an electronic signature should be recorded for a given document, how the recorded electronic signature should be authenticated, and how fulfillment of an obligation associated with the signed document should be processed. For example, in implementations where electronic signature system 300 receives incoming fulfillment notifications from document originator 100, document recipient 200, and/or a third party, configuration module 350 can be used to define how such notifications are further processed. Such further processing may include sending outgoing fulfillment notifications to specified parties, requesting that specified parties acknowledge the fulfillment event, and/or recording the fulfillment event in a document status index. To provide a specific example, configuration module 350 can be used to specify which party or parties should acknowledge fulfillment of an obligation in a given workflow before such fulfillment is recorded in a document status index. The various workflow aspects defined by configuration module 350 can be received via a configuration interface that is rendered at a computing device used by, for example, document originator 100 or document recipient 200.

Electronic signature system 300 may also include an interactivity module 360 configured to provide an interactivity interface to users accessing the workflows and resources managed by electronic signature system 300. Such an interface may be provided by way of a graphical user interface rendered on a digital display, although other types of interfaces can be implemented as well, including voice response interfaces, telephone touchtone interfaces, and textual interfaces. Such interfaces can be provided to one or more document originators 100 and/or one or more document recipients 200. For example, in one embodiment interactivity module 360 is configured to generate a graphical user interface capable of receiving commands, parameters, textual input, graphical input, audiovisual recordings and/or other data that constitute an electronic signature from document recipient 200. Interactivity module 360 can also be configured to receive and process incoming fulfillment notifications for document originator 100, document recipient 200, and third parties. Such processing may include soliciting further incoming fulfillment notifications from specified parties.

Still referring to the example embodiment illustrated in FIG. 1, electronic signature system 300 also includes a notification module 370. Notification module 370 is optionally configured to generate and distribute outgoing fulfillment notifications. In some embodiments an outgoing fulfillment notification is generated automatically, for example based on a previously defined template established by configuration module 350. In other embodiments an outgoing fulfillment notification is user-generated, for example as may be received from an interface generated by notification module 370 itself. In either case, notification module 370 can be configured to distribute such notifications according to a pre-established workflow. For example, in a specific implementation an outgoing fulfillment notification is distributed via email to document originator 100, document recipient 200, and a third party such as a government regulatory body. The outgoing fulfillment notification can also optionally be distributed to a storage resource, such as an audit data repository that is managed by electronic signature system 300.

In some cases notification module 370 is configured to generate a secure viewing environment for rendering an outgoing fulfillment notification. In such embodiments, instead of transmitting the notification to a recipient, notification module 370 sends the recipient a communication with instructions for accessing the secure viewing environment. The outgoing fulfillment notification is rendered only after the recipient is authenticated as having access to the secure viewing environment. In addition to providing an additional layer of security, such embodiments also allow electronic signature system 300 to track when such notifications are viewed by the intended recipient. Timestamp data specifying when the intended recipient viewed an outgoing fulfillment notification can be recorded in metadata associated with the notification and/or the related document.

Electronic signature system 300 also optionally includes a document status module 380. Document status module 380 can be configured to manage the status of documents used in a workflow that is orchestrated by electronic signature system 300. To this end, in certain embodiments document status module 380 is associated with a document status repository 306 that stores information with respect to the managed documents. In such embodiments, document status repository 306 may include a document status index 50 that correlates managed documents with a fulfillment status. Document status repository 306 may additionally or alternatively include other information, such as whether a particular document is associated with unfulfilled obligations, which parties (if any) have acknowledged that certain obligations have been fulfilled, and the distribution status of fulfillment notifications. Such information may also indicate whether a particular fulfillment notification has been authenticated, for example by leveraging authentication services 700. Document status index 50 may be stored locally in document status repository 306 (as illustrated in FIG. 1), or may be stored remotely at a networked document status storage resource. FIG. 2 is a schematic illustration of document status index 50 that correlates managed documents with a fulfillment status. In particular, document status index 50 identifies a document recipient 51, a document name 52, a document status 53, a status date 54, and one or more linked documents 55 for a plurality of managed documents. Additional or alternative information may be provided in other embodiments of document status index 50. In such embodiments document name 52 can serve as a unique document identifier. Document status module 380 optionally includes software and/or machine readable instructions that are configured to manage a data structure. In certain embodiments document status module 380 can be used to extract information from document status repository 306, such as by providing an interface that allows users to submit queries, for example, to search for documents associated with unfulfilled obligations, or to generate an audit trail for a particular document in a given workflow.

As illustrated in FIG. 1, electronic signature system 300 may include a document storage resource such as a document repository 302. Document repository 302 can be configured to store a plurality of managed documents 10 that are used by document originator 100 and/or document recipient 200. One or more of the managed documents 10 is associated with document metadata 14 that, for example, defines a workflow associated with the document, defines document status information (such as a listing of fulfilled and/or unfulfilled obligations), and/or defines any other supplemental information associated with the document. As schematically illustrated in FIG. 3A, in addition to metadata 14 a given electronic document 10 may include other components such as document terms 12 and an authenticated electronic signature 16. Document metadata 14 includes, among other things, a fulfillment status 14fs associated with electronic document 10. To provide a more specific example of electronic document 10, FIG. 3B schematically illustrates a purchase agreement 10' that includes a plurality of purchase terms 12' and a plurality of authenticated electronic signatures 16'. A fulfillment status 14fs' is represented by a hyperlink that is associated with a network address where a fulfillment status of purchase agreement 10' is stored.

Electronic signature system 300 may also include an audit data repository 304. Audit data repository 304 can be configured to store fulfillment notifications, such as an incoming fulfillment notification 20 and an outgoing fulfillment notification 30. Incoming and outgoing fulfillment notifications are each associated with metadata 26, 36 that defines one or more aspects of the notification, such as an associated document; an origination point; an associated workflow and/or routing; and any electronic signatures, digital certificates or other digital elements which have been applied to the notification. FIG. 4A is a schematic illustration of a first example outgoing fulfillment notification 30a indicating that two parties to an agreement have acknowledged fulfillment of the agreement. First example outgoing fulfillment notification 30a includes a document originator acknowledgement 32a as well as a document recipient acknowledgement 34a, and is associated with notification metadata 36a. FIG. 4B is a schematic illustration of a second example outgoing fulfillment notification 30b indicating that one party to an agreement has acknowledged fulfillment of the agreement. Second example outgoing fulfillment notification 30b includes a document recipient acknowledgement 34b, and is associated with notification metadata 36b.

As described herein, certain embodiments include supplementary resources and/or services, such as transcription services 600 and/or authentication services 700. Transcription services may include a text-to-speech module and/or a speech-to-text module which can be used to generate an audio version of a document or transcribe a spoken response received from a document recipient 200, respectively. Authentication services 700 can be configured to authenticate and authorize document originators 100, document recipients 200, and third parties before providing access to resources and/or workflows associated with electronic signature system 300. For example, configuration module 350 can be used to specify that authentication is required before an electronic signature is accepted, or before an incoming fulfillment notification is processed. Authentication can be provided by any appropriate existing or subsequently developed authentication scheme. For example, in certain embodiments a user can be required to provide a password, a public key, a private key, or other authorization token before being able to view a document, provide an electronic signature, or submit an incoming fulfillment notification. Providing such services by networked resources advantageously eliminates any need for such services to be provided locally at a device used by document originator 100 or document recipient 200. This allows users to leverage the functionality provided by electronic signature system 300 without any need to obtain specialized hardware or software, thereby providing networked functionality to users of devices having limited processing capability, such as public kiosks, smartphones, and tablet computers. Thus in certain embodiments transcription services 600 and/or authentication services 700 may be integrated into and provided by electronic signature system 300.

Document originator 100, document recipient 200, and electronic signature system 300 can communicate with each other via network 500. Network 500 can also be used to access supplementary services and resources, such as transcription services 600 and authentication services 700. Network 500 may be a local area network (such as a home-based or office network), a wide area network (such as the Internet), or a combination of such networks, whether public, private, or both. For example, in certain embodiments at least a portion of the functionality associated with network 500 is provided by a cellular data network, thereby making it easier for users of smartphones and other mobile devices to interact with electronic signature system 300. In general, communications amongst the various entities, resources, and services described herein may occur via wired and/or wireless connections, such as may be provided by Wi-Fi or mobile data networks. In some cases access to resources on a given network or computing system may require credentials such as a username and password, and/or may require compliance with any other suitable security mechanisms. Furthermore, while only one document originator 100 and one document recipient 200 are illustrated in the example embodiment of FIG. 1, it will be appreciated that in general the system may comprise a distributed network of tens, hundreds, thousands, or more document originators 100 and/or document recipients 200 capable of interacting with a correspondingly large number of electronic signature systems 300.

The embodiments disclosed herein can be implemented in various forms of hardware, software, firmware, and/or special purpose processors. For example, in one embodiment a non-transitory computer readable medium has instructions encoded thereon that, when executed by one or more processors, cause one or more of the automated methods for tracking and notification of fulfillment events disclosed herein to be implemented. The instructions can be encoded using any suitable programming language, such as C, C++, object-oriented C, JavaScript, Visual Basic .NET, BASIC, or alternatively, using custom or proprietary instruction sets. Such instructions can be provided in the form of one or more computer software applications and/or applets that are tangibly embodied on a memory device, and that can be executed by a computer having any suitable architecture. In one embodiment the system can be hosted on a given website and implemented, for example, using JavaScript or another suitable browser-based technology.

The functionalities disclosed herein can optionally be incorporated into other software applications, such as document management systems or document viewers. For example, an application configured to view portable document format (PDF) files can also be configured to implement certain of the functionalities disclosed herein upon detecting the presence of signature fields or other metadata in a given document, including signature fields intended for a handwritten signature. The systems disclosed herein may also optionally leverage services provided by other software applications, such as electronic mail readers. The computer software applications disclosed herein may include a number of different modules, sub-modules, or other components of distinct functionality, and can provide information to, or receive information from, still other components and/or subcomponents. These modules can be used, for example, to communicate with input and/or output devices such as a display screen, a touch sensitive surface, a printer, and/or any other suitable input/output device. Other components and functionality not reflected in the illustrations will be apparent in light of this disclosure, and it will be appreciated that the various embodiments disclosed herein are not limited to any particular hardware or software configuration. Thus in other embodiments electronic signature system 300 may comprise additional, fewer, or alternative subcomponents as compared to those included in the illustrated embodiments.

The aforementioned non-transitory computer readable medium may be any suitable medium for storing digital information, such as a hard drive, a server, a flash memory, and/or random access memory. In alternative embodiments, the computer and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that the present disclosure is not intended to be limited to any particular system architecture.

Methodology

Figure 5C:
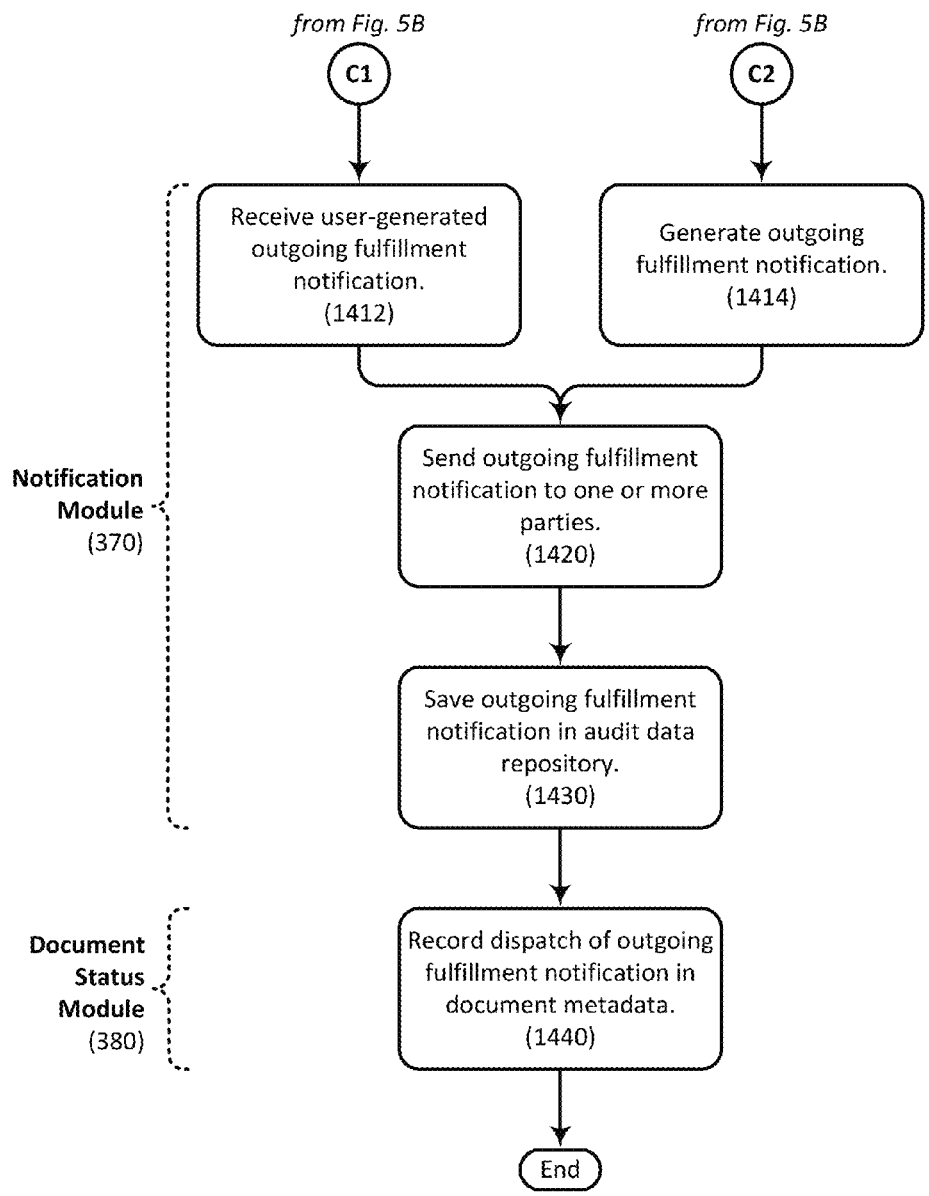

FIGS. 5A through 5C comprise a flowchart illustrating an example method 1000 for automated tracking and notification of fulfillment events associated with an electronic document. As can be seen, this method includes a number of phases and sub-processes, the sequence of which may vary from one embodiment to another. However, when considered in the aggregate, these phases and sub-processes form an automated method for tracking and notification of fulfillment events that is responsive to user commands in accordance with certain of the embodiments disclosed herein. This method can be implemented, for example, using the system architecture illustrated in FIG. 1 and described herein. However other system architectures can be used in other embodiments, as will be apparent in light of this disclosure. To this end, the correlation of the various functionalities shown in FIGS. 5A through 5C to the specific components illustrated in FIG. 1 is not intended to imply any structural and/or use limitations. Rather, other embodiments may include, for example, varying degrees of integration where multiple functionalities are effectively performed by one system. For example, in an alternative embodiment a single module is used to provide user interactivity and maintain document status information. Thus other embodiments may have fewer or more modules depending on the granularity of implementation. Numerous variations and alternative configurations will be apparent in light of this disclosure.

As illustrated in FIG. 5A, method 1000 commences with interactivity module 360 receiving an incoming fulfillment notification from at least one party. See reference numeral 1110 in FIG. 5A. In particular, the incoming fulfillment notification may be received from document originator 100, from document recipient 200, and/or from a third party such as an auditor or a regulatory organization. The incoming fulfillment notification is associated with a document managed by electronic signature system 300. For example, in one such embodiment, electronic signature system 300 is used to procure an electronic signature on a document, and subsequently process one or more incoming fulfillment notifications when an obligation associated with the electronically executed document is fulfilled. In such embodiments electronic signature system 300 can be configured to provide document originator 100 and/or document recipient 200 with instructions that explain how to report that an obligation has been fulfilled.

The incoming fulfillment notification may be automatically generated in response to a detected condition, such as when a monetary transfer is detected or when a parcel is delivered. In other implementations the incoming fulfillment notification is manually generated by a user, such as by document originator 100 or document recipient 200. For instance a user may send a text message or an electronic mail message with a narrative description of the fulfillment condition. In some cases the incoming fulfillment notification message can be identified as such on the basis of the content of the message, while in other embodiments, the message can be identified as an incoming fulfillment notification based on its receipt at a given address. For example, in one implementation a document recipient is instructed to send an email to a particular email address when a specified obligation has been fulfilled. In another implementation a document originator is instructed to send a text message to a particular phone number when a specified obligation has been fulfilled. Other techniques for generating the incoming fulfillment notification can be used in other embodiments.

Interactivity module 360 is further configured to save the incoming fulfillment notification in audit data repository 304. See reference numeral 1120 in FIG. 5A. In the example embodiment illustrated in FIG. 1, incoming fulfillment notification 20 is associated with metadata 26 that provides additional information relating to one or more aspects of incoming fulfillment notification 20. For example, metadata 26 may identify an electronically signed document to which the fulfillment relates; identify the party that sent or otherwise originated incoming fulfillment notification 20; include a timestamp associated with the point at which notification 20 was sent and/or received; and include electronic signature or other authentication information associated with the originator of incoming fulfillment notification 20. Metadata 26 also optionally includes a binary component comprising computer code that, when executed or otherwise processed by a software module, causes a particular workflow to be invoked or initiated. In some cases the workflow may cause incoming fulfillment notification 20 to be routed to other users and/or computer resources. Document status module 380 is also optionally configured to record receipt of incoming fulfillment notification 20 in metadata associated with a document to which the fulfillment relates. See reference numeral 1140 in FIG. 5A. This enables fulfillment notification information to be included with the related document itself which may be useful in implementations where a user without access to the electronic signature system 300 should still have access to information relating to the incoming fulfillment notification 20.

In some cases a workflow, for example as defined by configuration module 350, may call for incoming fulfillment notifications to be received from multiple parties. Therefore, after at least one incoming fulfillment notification is received, interactivity module 360 can be configured to determine whether all required incoming fulfillment notifications have been received. See reference numeral 1150 in FIG. 5A. If all required incoming fulfillment notifications have not been received, interactivity module 360 can be configured to further determine whether additional incoming notifications should be actively solicited. See reference numeral 1160 in FIG. 5A. If not, interactivity module 360 will wait to receive one or more additional incoming fulfillment notifications. See reference numeral 1180 in FIG. 5A. However, if the additional incoming notifications are to be actively solicited, interactivity module 360 can be configured to send one or more requests for fulfillment acknowledgement to specified parties. See reference numeral 1170 in FIG. 5A. For example, in one embodiment a request for fulfillment acknowledgement comprises an email communication that inquiries whether a particular obligation has been fulfilled and that provides instructions with respect to how to send a fulfillment notification to electronic signature system 300. In another embodiment a request for fulfillment acknowledgement provides access to an incoming fulfillment notification from a first party, thereby providing a second party with an opportunity to acknowledge the accuracy of the first party's fulfillment notification. Once any such requests are transmitted, interactivity module 360 waits to receive one or more additional incoming fulfillment notifications. See reference numeral 1180 in FIG. 5A.

Once all specified incoming fulfillment notifications are received, document status module 380 is configured to update document metadata to reflect fulfillment. See reference numeral 1210 in FIG. 5B. In particular, metadata associated with a document to which the fulfillment relates can be updated to indicate that one or more obligations associated with the document has been fulfilled. Updating document metadata enables fulfillment information to be included with the document itself which may be useful in implementations where a user without access to the electronic document signature system 300 should have access to the fulfillment information. Document status module 380 is additionally or alternatively configured to update a document status index to reflect fulfillment. See reference numeral 1220 in FIG. 5B. Document status index can be used to provide fulfillment status information for a plurality of documents managed by electronic signature system 300, as will be described in turn.

Electronic signature system 300 is optionally configured to generate and transmit an outgoing fulfillment notification. In such embodiments notification module 370 is configured to determine whether a user will create the outgoing fulfillment notification. See reference numeral 1230 in FIG. 5B. This determination may be based, for example, on a workflow configuration established by configuration module 350. If a user is to create the outgoing fulfillment notification, notification module 370 is configured to receive the user-generated outgoing fulfillment notification from the user. See reference numeral 1412 in FIG. 5C. For example, document originator 100, document recipient 200, and/or a third party may create a user-generated outgoing fulfillment notification. On the other hand, if the user will not create the outgoing fulfillment notification, notification module 370 can be configured to generate such notification automatically, for example based on a predefined template. See reference numeral 1414 in FIG. 5C. In some cases an automatically generated outgoing fulfillment notification comprises, or consists essentially of, computer code that when executed or otherwise processed by a software module, causes a particular workflow to be invoked or initiated. Regardless of how the outgoing fulfillment notification is generated, it may also include metadata that provides additional information relating to one or more aspects of the outgoing fulfillment notification. For example, in one implementation such metadata defines an electronic signature or other authentication information associated with the outgoing fulfillment notification. Metadata associated with an outgoing fulfillment notification may also include a timestamp indicating when the notification was sent, as well as routing information indicating the users to whom the notification was transmitted.

Still referring to FIG. 5C, notification module 380 can be configured to send the outgoing fulfillment notification to specified parties. See reference numeral 1420 in FIG. 5C. The outgoing fulfillment notification, including any associated metadata, can additionally or alternatively be saved in audit data repository 304. See reference numeral 1430 in FIG. 5C. In some cases the workflow may cause the notification to be routed to other users and/or computer resources. Where the outgoing fulfillment notification is transmitted to other parties from electronic signature system 300, document status module 380 can be configured to record the dispatch of the notification in metadata associated with the document to which the fulfillment relates. See reference numeral 1440 in FIG. 5C. This enables fulfillment notification information to be included with the related document itself which may be useful in implementations where a user without access to the electronic signature system 300 should have access to information relating to the fulfillment notification.

The various embodiments disclosed herein advantageously facilitate the tracking of document fulfillment status with the same electronic signature system that is used to procure electronic signatures on the tracked documents in the first place. For example, document originator 100, document recipient 200, or any other authorized third party may audit the incoming and/or outgoing fulfillment notifications. Such an audit may be conducted on an automated basis, for example in response to a detected event or according to an established periodic schedule. An audit may involve generating an audit trail document which lists information regarding the fulfillment notifications, such as in the form of a timeline. In one embodiment an audit trail document is generated and/or made available whenever an authorized party views a document managed by electronic signature system 300. In another embodiment fulfillment status is extracted from document status index 50 and is used as a criterion for generation of audit reports, for example such that a report listing only documents associated with fulfilled (or unfulfilled) obligations are included. Such reports can be generated manually or on an automated basis, for example in response to a detected event or according to an established schedule.

CONCLUSION

Numerous variations and configurations will be apparent in light of this disclosure. For instance, one example embodiment provides a method for tracking fulfillment events that comprises receiving, from a first party, an incoming fulfillment notification that includes a reference to an electronically signed document managed by an electronic signature system. The incoming fulfillment notification indicates that an obligation associated with the document has been fulfilled. The method further comprises recording receipt of the incoming fulfillment notification in an audit data repository that is managed by the electronic signature system. The method further comprises updating a document status data structure to indicate that the document is associated with a fulfilled obligation. The method further comprises transmitting, to a second party, an outgoing fulfillment notification that identifies the document. At least one of the first and second parties has electronically signed the document. In some cases the first and second parties are each selected from a group consisting of a document originator and a document recipient. In some cases the method further comprises transmitting a supplemental outgoing fulfillment notification to a third party which has not electronically signed the document. In some cases the method further comprises storing the incoming fulfillment notification and the outgoing fulfillment notification in the audit data repository. Each of the stored fulfillment notifications includes metadata comprising a transmission timestamp. In some cases the method further comprises storing the outgoing fulfillment notification in the audit data repository. The stored outgoing fulfillment notification includes metadata comprising a notification recipient identifier. In some cases the method further comprises receiving a second incoming fulfillment notification form the second party. The document status data structure is not updated until incoming fulfillment notifications are received from both the first and second parties. In some cases the incoming fulfillment notification is received by the electronic signature system. In some cases the electronic signature system is used to procure an electronic signature on the document from at least one of the first and second parties. In some cases the method further comprises generating the outgoing fulfillment notification. The outgoing fulfillment notification includes a textual narrative received from the first party. In some cases the method further comprises generating the outgoing fulfillment notification based on a predefined template that is populated using information extracted from the incoming fulfillment notification.

Another example embodiment provides a document processing system that comprises a document repository configured to store an electronically signed document that is identified by a unique document identifier. The electronically signed document is also signed by at least one of a document recipient and a document originator. The electronically signed document is also associated with document metadata indicating a fulfillment status of the document. The system further comprises an audit data repository configured to store an incoming fulfillment notification that is received from at least one of the document recipient and the document originator. The system further comprises a document status data structure that correlates the fulfillment status of the electronically signed document with the unique document identifier. The system further comprises a document status module configured to modify the fulfillment status based on the incoming fulfillment notification. The system further comprises a notification module configured to generate an outgoing fulfillment notification in response to modification of the fulfillment status. In some cases the incoming fulfillment notification is associated with notification metadata that identifies an originator of the incoming fulfillment notification. In some cases the system further comprises an interactivity module configured to solicit electronic signatures from at least one of the document recipient and the document originator on the document. In some cases the system further comprises an interactivity module configured to solicit an incoming fulfillment notification from at least one of the document recipient and the document originator. In some cases the audit data repository is further configured to store the outgoing fulfillment notification. In some cases the document status module is configured to modify the fulfillment status in the document metadata and in the document status data structure.

Another example embodiment provides a computer program product encoded with instructions that, when executed by one or more processors, causes a document workflow process to be carried out. The process comprises receiving, from a first party, an incoming fulfillment notification that includes a reference to an electronically signed document managed by an electronic signature system. The incoming fulfillment notification indicates that an obligation associated with the document has been fulfilled. The process further comprises recording receipt of the incoming fulfillment notification in an audit data repository that is managed by the electronic signature system. The process further comprises updating a document status data structure to indicate that the document is associated with a fulfilled obligation. The process further comprises transmitting, to a second party, an outgoing fulfillment notification that identifies the document. At least one of the first and second parties has electronically signed the document using the electronic signature system. In some cases the process further comprises (a) receiving, from at least one of the first and second parties, an inquiry regarding a collection of documents managed by the electronic signature system, wherein the inquiry specifies a fulfillment status; and (b) generating, based on information extracted from the document status data structure, a filtered listing of documents managed by the electronic signature system that correspond to the specified fulfillment status. In some cases the outgoing fulfillment notification comprises a hyperlink that provides access to a secure viewing environment, wherein the second party can access the secure viewing environment only after submitting an authentication credential. In some cases the process further comprises, in response to receiving the incoming fulfillment notification from the first party, sending a request for fulfillment acknowledgement to the second party, wherein the request includes information extracted from the incoming fulfillment notification.

The foregoing detailed description is presented for the purposes of illustration and description. It is not intended to be exhaustive or to limit the invention to the particular discoed embodiments. Many modifications and variations are possible in light of this disclosure. Thus it is intended that the scope of the invention be limited not by this detailed description, but rather by the claims appended hereto. This disclosure is related to U.S. patent application Ser. No. 14/069,674 (filed 1 Nov. 2013), the entire disclosure of which is hereby incorporated by reference herein. This disclosure is related to U.S. patent application Ser. No. 14/534,583 (filed 6 Nov. 2014), the entire disclosure of which is hereby incorporated by reference herein.

What is claimed is:

1. A document processing system that comprises:
  a document repository configured to store an electronically signed document that is identified by a unique document identifier, that is signed by at least one of a document recipient and a document originator, and that is associated with document metadata indicating a fulfillment status of the electronically signed document;
  an interactivity module configured to automatically generate an incoming fulfillment notification in response to an incoming communication reporting a detected fulfillment of an obligation of at least one of the document recipient and the document originator, wherein
    the obligation is set forth in the electronically signed document, the generated incoming fulfillment notification is stored in an audit data repository, the incoming fulfillment notification is generated after the document is electronically signed by at least one of the document recipient and the document originator, and the incoming communication is identified as reporting the detected fulfillment based on receipt of at least one of (a) an email received at a particular email address, and (b) a text message received at a particular phone number;

a document status data structure that correlates the fulfillment status of the electronically signed document with the unique document identifier;

a document status module configured to modify the fulfillment status based on the incoming fulfillment notification; and a notification module configured to automatically generate an outgoing fulfillment notification in response to modification of the fulfillment status and transmit the outgoing fulfillment notification to at least one of the document recipient and the document originator, wherein the outgoing fulfillment notification comprises a hyperlink that provides access to a secure viewing environment only upon verification of a submitted authentication credential.

2. The document processing system of claim 1, wherein the incoming communication identifies an originator of the incoming communication.

3. The document processing system of claim 1, wherein the interactivity module is further configured to solicit electronic signatures from at least one of the document recipient and the document originator.

4. The document processing system of claim 1, wherein:
the incoming communication indicates that the obligation was fulfilled after all required signatories electronically signed the document; and
the required signatories are selected from a group consisting of the document recipient and the document originator.

5. The document processing system of claim 1, wherein the audit data repository is further configured to store the outgoing fulfillment notification.

6. The document processing system of claim 1, wherein the document status module is configured to modify the fulfillment status in the document metadata and in the document status data structure.

7. A method for tracking fulfillment events, the method comprising:
storing, in a document repository, an electronically signed document that is identified by a unique document identifier, and that is associated with document metadata indicating a fulfillment status of the electronically signed document;
automatically generating an incoming fulfillment notification in response to an incoming communication reporting a detected fulfillment of an obligation of a first party, wherein
the obligation is set forth in the electronically signed document,
the generated incoming fulfillment notification is stored in an audit data repository, and
the incoming communication is identified as reporting the detected fulfillment based on receipt of at least one of (a) an email received at a particular email address, and (b) a text message received at a particular phone number;
correlating, in a document status data structure, the fulfillment status of the electronically signed document with the unique document identifier;
modifying the fulfillment status based on the incoming fulfillment notification;
automatically generating an outgoing fulfillment notification in response to modification of the fulfillment status, wherein the outgoing fulfillment notification comprises a hyperlink that provides access to a secure viewing environment only upon verification of a submitted authentication credential; and
transmitting the outgoing fulfillment notification to a second party;
wherein at least one of the first and second parties have signed the electronically signed document before the incoming fulfillment notification is generated.

8. The method of claim 7, wherein the electronically signed document is signed by at least one of a document originator and a document recipient.

9. The method of claim 7, further comprising transmitting the outgoing fulfillment notification to a third party which has not signed the electronically signed document.

10. The method of claim 7, further comprising storing the outgoing fulfillment notification in the audit data repository, wherein each of the fulfillment notifications stored in the audit data repository includes metadata comprising a timestamp.

11. The method of claim 7, further comprising storing the outgoing fulfillment notification in the audit data repository, wherein the stored outgoing fulfillment notification includes metadata comprising a notification recipient identifier.

12. The method of claim 7, further comprising receiving a second incoming communication reporting a detected fulfillment of an obligation of the second party, wherein the fulfillment status is not modified until incoming communications are received from both the first and second parties.

13. The method of claim 7, wherein the incoming communication is received by an electronic signature system.

14. The method of claim 7, further comprising soliciting an electronic signature from at least one of a document originator and a document recipient before the obligation associated with the detected fulfillment is fulfilled.

15. The method of claim 7, wherein the outgoing fulfillment notification includes a textual narrative received from a signatory of the electronically signed document.

16. The method of claim 7, wherein the outgoing fulfillment notification is generated based on a predefined template that is populated using information extracted from the incoming fulfillment notification.

17. A computer program product encoded with instructions that, when executed by one or more processors, causes a document workflow process to be carried out, the process comprising:
storing, in a document repository, an electronically signed document that is identified by a unique document identifier, and that is associated with document metadata indicating a fulfillment status of the electronically signed document;
automatically generating an incoming fulfillment notification in response to an incoming communication reporting a detected fulfillment of an obligation of a first party, wherein
the obligation is set forth in the electronically signed document,
the generated incoming fulfillment notification is stored in an audit data repository, and the incoming communication is identified as reporting the detected fulfillment based on receipt of at least one of (a) an email received at a particular email address, and (b) a text message received at a particular phone number;

correlating, in a document status data structure, the fulfillment status of the electronically signed document with the unique document identifier;

modifying the fulfillment status based on the incoming fulfillment notification;

automatically generating an outgoing fulfillment notification in response to modification of the fulfillment status, wherein the outgoing fulfillment notification comprises a hyperlink that provides access to a secure viewing environment only upon verification of a submitted authentication credential; and transmitting the outgoing fulfillment notification to a second party;

wherein at least one of the first and second parties have signed the electronically signed document before the incoming fulfillment notification is generated.

18. The computer program product of claim 17, wherein the document workflow process further comprises:

receiving, from a signatory to the electronically signed document, an inquiry regarding a collection of documents stored in the document repository, wherein the inquiry specifies a queried fulfillment status; and generating, based on information extracted from the document status data structure, a filtered listing of documents stored in the document repository that correspond to the queried fulfillment status.

19. The computer program product of claim 17, wherein the document workflow process further comprises, in response to receiving the incoming communication, sending a request for fulfillment acknowledgement to the second party, wherein the request includes information extracted from the incoming communication.

* * * * *